(12) United States Patent
Reynolds et al.

(10) Patent No.: US 8,904,423 B2
(45) Date of Patent: Dec. 2, 2014

(54) WEB TO VIDEO-ON-DEMAND SYSTEM, AUTHENTICATION ENGINE AND METHOD FOR USING SAME

(75) Inventors: Jennifer Reynolds, Johns Creek, GA (US); Charles Dasher, Lawrenceville, GA (US); Paul Canter, Gainesville, GA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 503 days.

(21) Appl. No.: 13/027,307

(22) Filed: Feb. 15, 2011

(65) Prior Publication Data
US 2012/0210340 A1 Aug. 16, 2012

(51) Int. Cl.
| | |
|---|---|
| H04N 7/16 | (2011.01) |
| H04N 7/173 | (2011.01) |
| H04N 21/258 | (2011.01) |
| H04N 21/472 | (2011.01) |
| H04N 21/475 | (2011.01) |
| H04N 21/2543 | (2011.01) |
| H04N 21/658 | (2011.01) |
| H04N 21/4143 | (2011.01) |

(52) U.S. Cl.
CPC ... *H04N 21/47202* (2013.01); *H04N 21/25816* (2013.01); *H04N 21/4753* (2013.01); *H04N 21/2543* (2013.01); *H04N 21/6582* (2013.01); *H04N 21/25875* (2013.01); *H04N 21/4143* (2013.01)
USPC ............... 725/28; 725/87; 725/105; 725/25; 725/1

(58) Field of Classification Search
USPC .................................................. 725/132
See application file for complete search history.

(56) References Cited

U.S. PATENT DOCUMENTS

| | | | |
|---|---|---|---|
| 7,137,006 B1 * | 11/2006 | Grandcolas et al. | 713/180 |
| 2004/0187154 A1 | 9/2004 | Wasilewski | |
| 2006/0117344 A1 * | 6/2006 | Lamkin et al. | 725/38 |
| 2007/0143831 A1 * | 6/2007 | Pearson et al. | 726/5 |
| 2008/0046946 A1 * | 2/2008 | Diroo et al. | 725/112 |
| 2008/0313648 A1 * | 12/2008 | Wang et al. | 719/315 |
| 2009/0100505 A1 * | 4/2009 | Shaty | 726/3 |
| 2010/0049790 A1 * | 2/2010 | Schreiber | 709/203 |
| 2010/0066805 A1 * | 3/2010 | Tucker et al. | 348/14.08 |
| 2010/0071020 A1 * | 3/2010 | Addington et al. | 725/132 |
| 2010/0083322 A1 | 4/2010 | Rouse | |
| 2010/0242062 A1 * | 9/2010 | Reynolds et al. | 725/25 |
| 2010/0251144 A1 * | 9/2010 | Shaty | 715/760 |

* cited by examiner

*Primary Examiner* — Brian T Pendleton
*Assistant Examiner* — Jean D Saint Cyr

(57) ABSTRACT

A system, an authentication engine and a method are described herein for authenticating an end user and associating their set-top box with a third party web based application to stream a third party video to the set-top box. In one example, the end user may utilize a client device (e.g., computer, laptop computer, smart phone) to access via the internet the third party video provider which lists a number of videos that the end user could watch on their television. The end user would select one of the videos to watch and then their cable provider would stream the video to the end-user's set-top box to be displayed on their television. To enable this service, the authentication system authenticates the end user and associates their set-top box with the third party video provider's web based application.

37 Claims, 4 Drawing Sheets

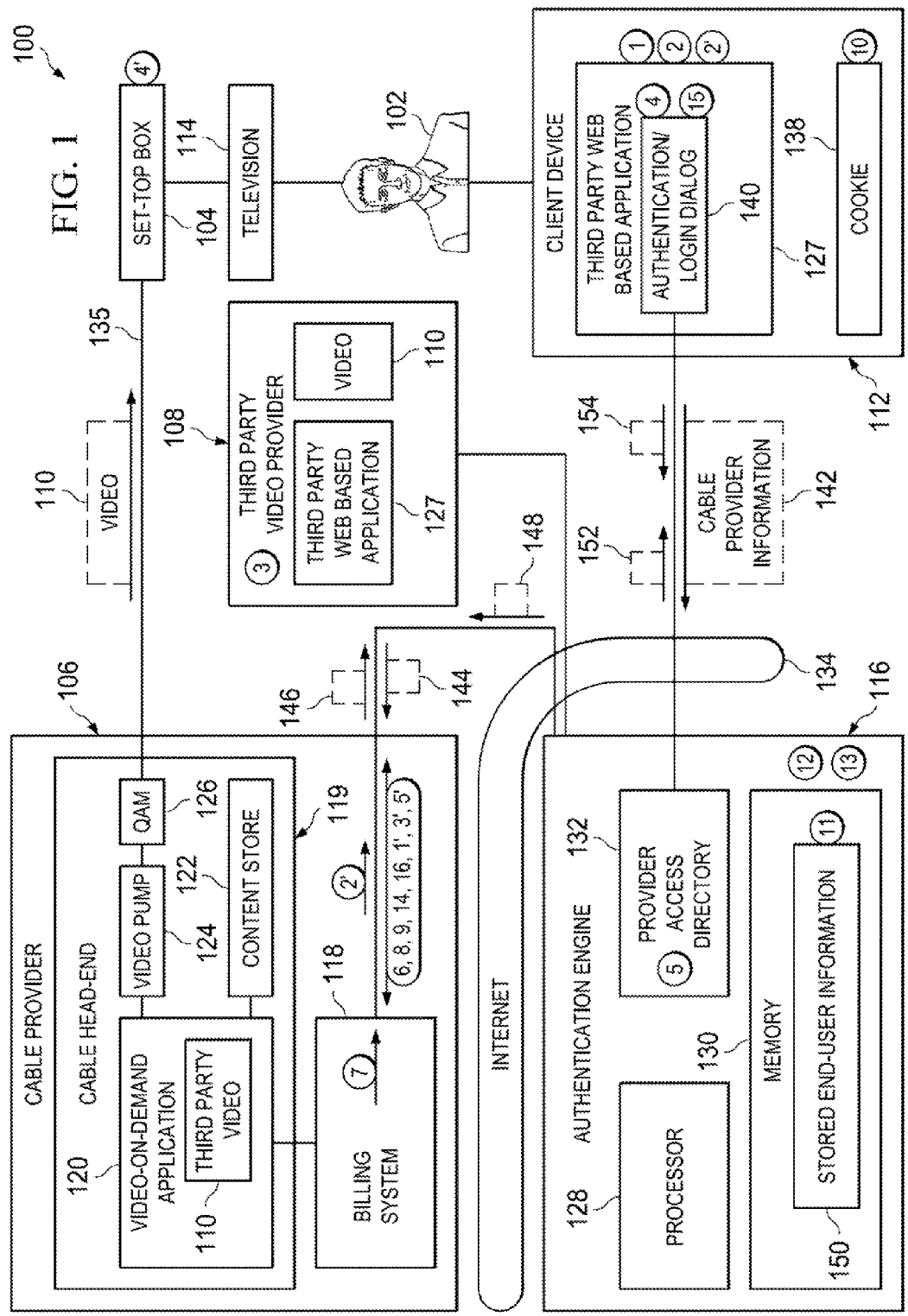

WEB TO VIDEO-ON-DEMAND SYSTEM, AUTHENTICATION ENGINE AND METHOD FOR USING SAME

TECHNICAL FIELD

The present invention relates to a system, an authentication engine and a method for authenticating an end user and associating their set-top box with a third party web based application to stream a third party video to the set-top box.

BACKGROUND

An end user may want to watch a video that they selected from a third party video provider over the internet where their cable provider (not related to the third party video provider) then streams the video to their set-top box to be displayed on a television. For instance, the end user may utilize a client device (e.g., computer, laptop computer, smart phone) to access via the internet the third party video provider (e.g., Amazon.com) which lists a number of videos that the end user could watch on their television. The end user would select one of the videos to watch and then their cable provider would stream the video to the end-user's set-top box to be displayed on their television. However, this desirable service is not currently available because there is no authentication system available that can authenticate the end user and associate their set-top box with the third party video provider's web based application. This need and other needs are satisfied by the present invention.

SUMMARY

A system, an authentication engine and a method for authenticating an end user and associating their set-top box with a third party web based application to stream a third party video to the set-top box are described in the independent claims of the present application. Advantageous embodiments of the system, the authentication engine, and the method are described in the dependent claims.

In an aspect, the present invention provides a system for authenticating an end user and associating their set-top box with a third party web based application to stream a third party video to the set-top box. The system comprises a third party video provider (including a third party web based application), a client device, an authentication engine, and a cable provider (including a cable head-end, a billing system, and a video-on-demand application). The client device has the third party web based application downloaded therein by the end user. The end user uses the third party web based application to select a video to be streamed to the set-top box. The third party video provider checks if the client device contains an authentication cookie and if there is no authentication cookie then an authentication-login dialog is presented in the downloaded third party web based application which prompts the end user to enter cable provider information. The authentication engine receives the cable provider information and uses a provider access directory located therein to determine a cable provider and a cable head-end that services the set-top box. The authentication engine sends an end user verification message to the cable head-end. The cable head-end is associated with a billing system which receives the end user verification message and if the end user is associated with the cable provider then sends an end user verification acknowledgment message to the authentication engine. The authentication engine receives the end user verification acknowledgement message and then interacts with the billing system to map the set-top box to the end user. The authentication engine after the set-top box is mapped to the end user requests the cable head-end to stream the video from the video-on-demand application (which received the video from the third party video provider) to the set-top box. The authentication engine stores the cable provider information and corresponding information related to the cable provider and the cable head-end for subsequent use to stream another video to the set-top box without requiring the end user to enter all of the cable provider information into the authentication-login dialog, wherein the another video is associated with either the third party video provider or another third party video provider. An advantage of the system is that it enables an end user to watch a video that they selected from a third party video provider over the internet where their cable provider (not related to the third party video provider) streams the video to their set-top box to be displayed on a television.

In another aspect, the present invention provides a method for authenticating an end user and associating their set-top box with a third party web based application to stream a third party video to the set-top box. The method comprises the steps of: (a) downloading a third party web based application into a client device, wherein the end user interacts with the third party web based application to select a video to be streamed to the set-top box; (b) checking, at a third party video provider, if the client device contains an authentication cookie and if there is no authentication cookie then presenting an authentication-login dialog in the downloaded third party web based application which prompts the end user to enter cable provider information; (c) receiving, at an authentication engine, the cable provider information and using a provider access directory located therein to determine a cable provider and a cable head-end that services the set-top box; (d) sending, from the authentication engine, an end user verification message to the cable head-end; (e) receiving, at the cable head-end, the end user verification message and if the end user is associated with the cable provider then sending an end user verification acknowledgment message to the authentication engine, wherein the cable head-end is associated with a billing system and a video-on-demand application, wherein the video-on-demand application contains the video, and wherein the billing system receives the end user verification message and determines if the end user is associated with the cable provider; (f) receiving, at the authentication engine, the end user verification acknowledgement message and then interacting with the billing system to map the set-top box to the end user; (g) requesting, at the authentication engine, the cable head-end to stream the video from the video-on-demand application (which received the video from the third party video provider) to the set-top box; and (h) storing, at the authentication engine, the cable provider information and corresponding information related to the cable provider and the cable head-end for subsequent use to stream another video to the set-top box without requiring the end user to enter all of the cable provider information into the authentication-login dialog, wherein the another video is associated with either the third party video provider or another third party video provider. An advantage of the method is that it enables an end user to watch a video that they selected from a third party video provider over the internet where their cable provider (not related to the third party video provider) streams the video to their set-top box to be displayed on a television.

In yet another aspect, the present invention provides an authentication engine that is used in a system which includes a third party video provider with a third party web based application, a client device which has the third party web based application downloaded therein by the end user, wherein the end user uses the third party web based application to select a third party video to be streamed to the set-top box, and the third party video provider checks if the client device contains an authentication cookie and if there is no authentication cookie then an authentication-login dialog is presented in the downloaded third party web based application which prompts the end user to enter cable provider information. The authentication engine comprises: (a) a provider access directory; (b) a processor; and (c) a non-transitory memory that stores processor-executable instructions wherein the processor interfaces with the non-transitory memory and executes the processor-executable instructions to: (i) receive the cable provider information and use the provider access directory to determine a cable provider and a cable head-end that services the set-top box; (ii) send an end user verification message to the cable head-end, wherein the cable head-end receives the end user verification message and determines if the end user is associated with the cable provider and if yes sends an end user verification acknowledgment message; (iii) receive the end user verification acknowledgement message and interact with the cable head-end to map the set-top box to the end user; (iv) request the cable head-end to stream the video from the video-on-demand application (which received the video from the third party video provider) to the set-top box after the set-top box is mapped to the end user; and (v) store the cable provider information and corresponding information related to the cable provider and the cable head-end for subsequent use to stream another video to the set-top box without requiring the end user to enter all of the cable provider information into the authentication-login dialog, wherein the another video is associated with either the third party video provider or another third party video provider. An advantage of the authentication engine is that it enables an end user to watch a video that they selected from a third party video provider over the internet where their cable provider (not related to the third party video provider) streams the video to their set-top box to be displayed on a television.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 1 a block diagram of a system for authenticating an end user and associating their set-top box (controlled by a cable provider) with a third party web based application (controlled by a third party video provider) to stream a third party's video to the set-top box in accordance with an embodiment of the present invention;

DETAILED DESCRIPTION

Figure 2A:
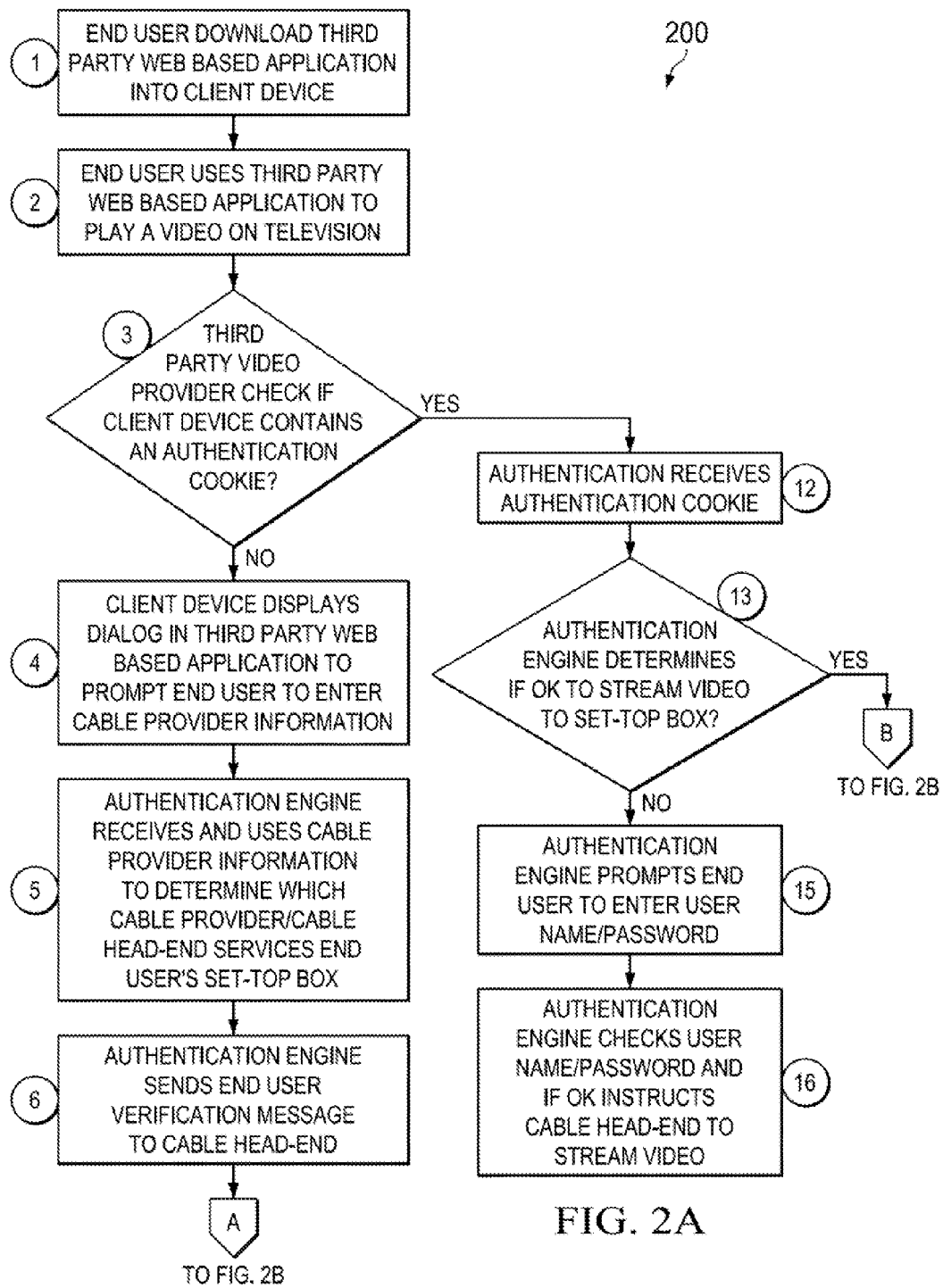
FIG. 2 is a flowchart illustrating the basic steps of a method for authenticating an end user and associating their set-top box (controlled by a cable provider) with a third party web based application (controlled by a third party video provider) to stream a third party's video to the set-top box in accordance with an embodiment of the present invention.

Referring to FIG. 1, there is a block diagram of a system 100 for authenticating an end user 102 and associating their set-top box 104 (controlled by a cable provider 106) with a third party web based application 127 (controlled by a third party video provider 108) to stream a third party's video 110 to the set-top box 104 in accordance with an embodiment of the present invention. The system 100 includes the set-top box 104, a client device 112 (e.g., computer 112, smart phone 112, personal digital assistant 112) and a television 114 all of which are associated with the end user 102. In addition, the system 100 includes the cable provider 106, the third party video provider 108, and an authentication engine 116. The cable provider 106 includes at least a billing system 118 and a cable head-end 119 which includes a video-on-demand application 120, a content store 122, a video pump 124, and a Quadrature Amplitude Modulation (QAM) device 126. The third party video provider 108 includes the third party video 110 and a third party web based application 127 (e.g., third party web site 127). The authentication engine 116 includes at least a processor 128, a memory 130, and a provider access directory 132. As shown, the client device 112 is coupled via the internet 134 to the authentication engine 116. The authentication engine 116 is coupled via the internet 134 to the third party video provider 108 and the cable provider 106. The cable provider 106 is coupled via fiber optic cable 135 (or the Internet 134, a satellite wireless connection) to the set-top box 104. A detailed discussion about how the cable provider 106, the third party video provider 108, the authentication engine 116, and the client device 112 interact with one another to stream the third party video 110 to the end user's set-top box 104 in accordance with an embodiment of the present invention is provided next with respect to FIGS. 2-3.

Figure 2B:
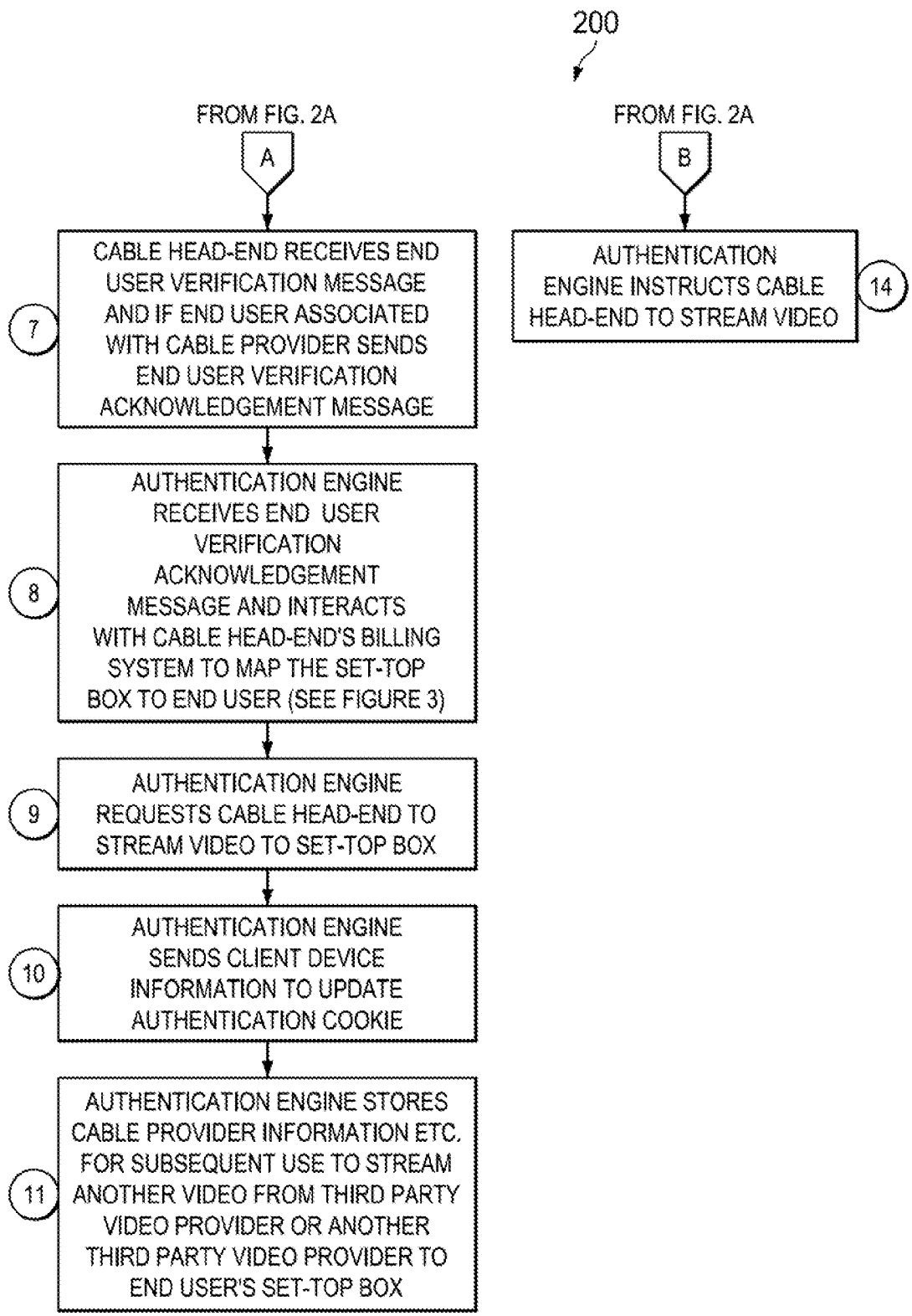

Referring to FIG. 2, there is a flowchart illustrating the basic steps of a method 200 for authenticating the end user 102 and associating their set-top box 104 (controlled by a cable provider 106) with the third party web based application 127 (controlled by a third party video provider 108) to stream the third party's video 110 to the set-top box 104 in accordance with an embodiment of the present invention. The basic steps are discussed next as follows:

Step 1: The end user 102 downloads the third party web based application 127 (e.g., third party website 127) into their client device 112. The third party web based application 127 exposes video assets which can be played on the set-top box 104/television 114 and presents the end user 102 an option to view one or more of those video assets on their set-top box 104/television 114. Note: step 1 and the subsequent steps 2-16 have also been illustrated in FIG. 1.

Step 2: The end user 102 uses the third party web based application 127 to select a video 110 to be streamed to their set-top box 104 and displayed on their television 114 (or other display device).

Step 3: The third party video provider 108 checks if the client device 112 contains an authentication cookie 138. If yes, steps 4-11 are performed. If no, then steps 12-16 are performed.

Step 4: If there is no authentication cookie 138 then the third party video provider 106 presents an authentication-login dialog 140 into the downloaded third party web based application 127. The authentication-login dialog 140 prompts the end user 102 to enter cable provider information 142. The cable provider information 142 can include (for example): a cable provider identifier, a user name, a password, an identifier associated with the selected video 110, and a zip code (or other end user geographical location identifier). The user name and password are the same as what the end user 102 has established with the cable provider 106. The zip code is used to identify the geographical location of the end user 102 so that the specific cable provider's cable head-end 119 can be identified that services the set-top box 104. This is needed because the cable provider 106 has many cable head-ends 119.

Step 5: The authentication engine 116 receives the cable provider information 142 and uses the provider access directory 132 located therein to determine the specific cable provider 106 and the specific cable head-end 119 that services the end user's set-top box 104.

Step 6: The authentication engine 116 sends an end user verification message 144 to the cable head-end 119. In particular, the authentication engine 116 sends the end user verification message 144 to the billing system 118. The end user verification message 144 includes at least the end user's user name and password which indicate that the end user 102 has the right to control the set-top box 104.

Step 7: The billing system 118 receives the end user verification message 144 and uses the received user name and password to check if the end user 102 is associated (subscribes) with the cable provider 106 and if yes then sends an end user verification acknowledgment message 146 to the authentication engine 116. If the end user 102 is not associated (subscribes) with the cable provider 106, then the billing system 118 informs the authentication engine 116 that the cable provider 106 does not or will not service the end user 102.

Step 8: The authentication engine 116 receives the end user verification acknowledgement Message 146 and then interacts with the billing system 118 to map the set-top box 104 to the end user 106. An example of how the set-top box 104 can be mapped to the end user 106 is discussed below with respect to FIG. 3.

Step 9: The authentication engine 116 sends a request message 148 to the cable head-end 119 requesting that the video 110 be streamed from the video-on-demand application 120 to the set-top box 104. Of course, the third party video provider 108 would have previously downloaded the video 110 into the video-on-demand application 120 some time prior to step 9. In the example shown, the third party video provider 108 would download the video 110 into the video-on-demand application 120 through the authentication engine 116. Note: the end-user 102 while watching the video 100 can send a trick mode command (play, pause, fast forward, rewind) from the client device 112 to the authentication server 116 which can pass the request along to the video-on-demand application 120 which in turn sets up the controls the streaming of the video 110 to the end users set-top box 104.

Step 10: The authentication engine 116 sends updated authentication information 150 to be stored in the client device's authentication cookie 138 for future use in case the end user 102 requests the third party video provider 108 or another third party video provider (not shown) to stream another video to the set-top box. For instance, the updated IS authentication information 152 can include an identifier of the third party video provider 108, possibly an expiration time indicator, and possibly an authentication token. See steps 12-16 for discussion about how this information is used when the third party video provider 108 in step 3 determines that the client device 112 contains the authentication cookie 138.

Step 11: The authentication engine 116 stores end user information 150 related to the cable provider information 142 and corresponding information related to the cable provider 106 and cable head-end 119 (e.g., hostname or internet protocol address) for subsequent use to stream another video to the set-top box 104 without requiring the end user 102 to re-enter all of the cable provider information 142 into the authentication-login dialog 140. The another video can be associated with either the third party video provider 108 or another third party video provider (not shown).

Step 12: In the event, the third party video provider 108 determines during step 3 that the client device 112 contains the authentication cookie 138 then the authentication engine 116 receives authentication information 154 from the authentication cookie 138. For instance, the authentication information 154 can include an identifier for each third party video provider that has previously streamed a video to the end user's set-top box 104. In addition, the authentication information 152 could include an expiration time indicator and possibly an authentication token.

Steps 13-16: The authentication engine 116 checks the authentication information 154 to determine (step 13) if it is ok to instruct the cable head-end 119 to stream the video 110 to the set-top box 104. If ok, then the authentication engine 116 instructs (step 14) the cable head-end 119 to stream the video 110 to the set-top box 104. If not ok, then the authentication engine 116 prompts (step 15) the end user 102 to input a user name and password but not all of the cable provider information 142 into the authentication-login dialog 140 and then checks (step 16) the entered user name and password and if ok then the authentication engine 116 instructs the cable head-end 119 to stream the video 110 to the set-top box 104. A discussion about two exemplary scenarios involving steps 13-16 is provided next.

In one scenario, assume the authentication information 154 includes an identifier of the third party video provider 108 which means that the third party video provider 108 has previously streamed a video to the end user's set-top box 104. The authentication engine 116 would use the stored end user information 150 to request the cable head-end 119 to stream the video 110 to the set-top box 104 without having to re-authenticate the end user 102 or map the set-top box 104. In the event, the authentication information 154 also included an expiration time indicator then the authentication engine 116 would determine if the time expiration has passed and if yes then the authentication engine 116 would request the end user 102 to enter their username and password but not all of the other cable provider information into the authentication-login dialog 140 and then if ok request the cable head-end 119 to stream the video 110 to the set-top box 104.

In another scenario, assume the authentication information 154 includes an identifier of another third party video provider which means that the third party video provider 108 has not previously streamed a video to the end user's set-top box 104. The authentication engine 116 would request the end user 102 to enter their username and password but not all of the other cable provider information into the authentication-login dialog 140 and if ok then request the cable head-end 119 to stream the video 110 to the set-top box 104. In the event, the authentication information 154 includes the authentication token then the authentication engine 116 can use that information to determine the user name and password of the end user 102 in which case the end user 102 does not need to re-enter the user name and password into the authentication-login dialog 140.

Note: those skilled in the art will appreciate that the cable provider 106, the third party video provider 108, the client device 112, and the authentication engine 116 may include more components than are shown and discussed herein. This is because only the components that are necessary to describe and enable the present invention have for clarity been discussed herein.

Figure 3:
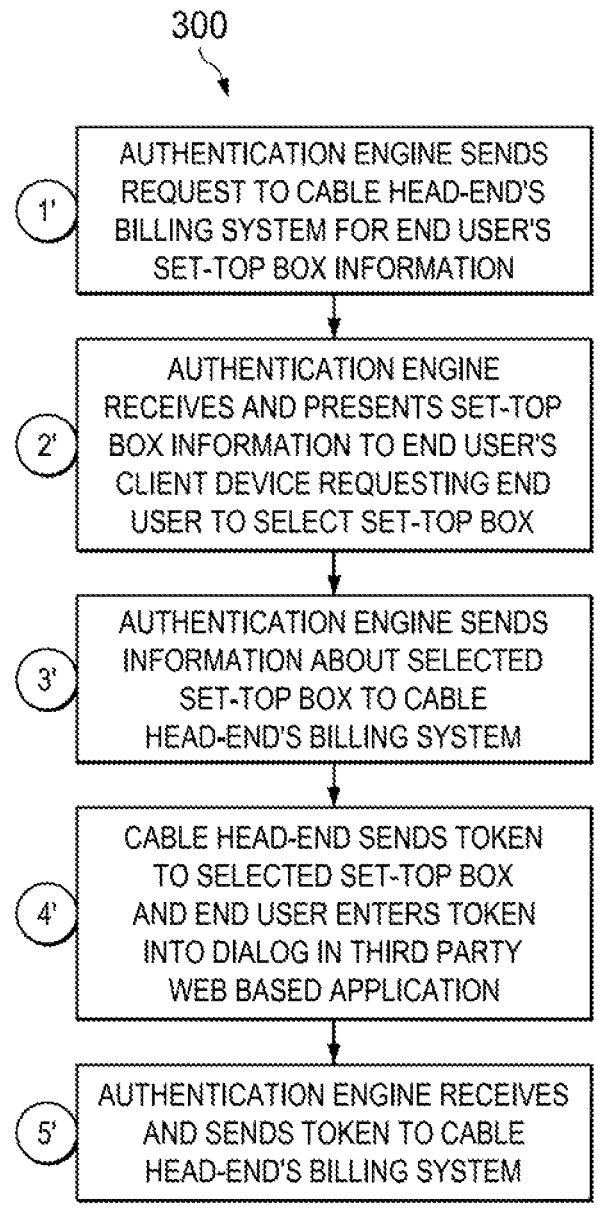
FIG. 3 is a flowchart illustrating exemplary steps that can be used to map the end user to their set-top box associated per step 8 of FIG. 2 in accordance with an embodiment of the present invention.

Referring to FIG. 3, there is a flowchart illustrating exemplary steps that can be used to map the end user 102 to their set-top box 104 per step 8 of method 200 in accordance with an embodiment of the present invention. The exemplary steps are discussed next as follows:

Step 1': The authentication engine 116 sends a request to the billing system 118 for set-top box information associated with the end user 102. For instance, the end user 102 may have several set-top boxes located within their home and each set-top box has a unique identifier or logical name such as (for example): living room, master bed-room, media-room, kids room. Note: step 1' and the subsequent steps 2'-5' have also been illustrated in FIG. 1.

Step 2': The authentication engine 116 receives the end user's set-top box information and presents the set-top box information in the authentication-login dialog 140 and requests the end user 102 to select the set-top box 104 associated with the television 114 that they want to view the video 110.

Step 3': The authentication engine 116 sends information about the selected set-top box 104 to the billing system 118. In this way, the cable head-end 119 will stream the video 110 to the correct set-top box 104.

Steps 4'-5' (optional): The billing system 118 receives the information about the selected set-top box 104 and then sends (step 4') a token (e.g., number, text, image, audible token) to be displayed at the selected set-top box 104 and the end user 102 enters the token into the authentication-login dialog box 102. The authentication engine 116 receives (step 5') the token entered into the authentication-login dialog box 104 and sends the token to the billing system 118 which confirms or denies the mapping of the set-top box 104 to the end user 102.

From the foregoing, one skilled in the art will appreciate that the system 100, method 200 and authentication engine 116 described above enable the end user 102 to watch the video 110 that they selected using their client device 112 from the third party video provider 108 where their cable provider 106 then streams the video 110 to their set-top box 104 to be displayed on a television 114. Thus, the end user 102 not only has a new service they can use to view a video 110 but since the third party video provider 108 may offer higher resolution video than the cable provider 106 this could give the end user 102 a much better video viewing experience. Furthermore, the cable provider 106 could sell the right to play or view the video 110 using their equipment to the third party video providers 108 and/or the end users 102. In this regard, the cable provider 106 could provide a web api (javascript or web services) that the third party video provider 108 uses to create their third party website 127. In addition, the present invention enables other types of applications such as a learning application which could involve showing clips of historical events or a maps application that would allow users to take a high-definition tour of a place of interest to be made available to the end user 102. As discussed above, the authentication engine 116 makes this all possible since it authenticates the end user 102 and associates their set-top box 104 with a third party web based application 127 (third party video provider 108) so the third party video 110 can be streamed by the cable provider 106 to the set-top box 104. A detailed discussion about an exemplary authentication engine 116 is provided next.

The authentication engine 116 is used in the system 100 which includes the third party video provider 108 with a third party web based application 127, and the client device 112 which has the third party website 127 downloaded therein by the end user 102 (step 1). The end user 102 uses the third party web based application 127 to select the third party video 110 to be streamed to the set-top box 104 (step 2). The third party video provider 108 checks if the client device 112 contains an authentication cookie 138 and if there is no authentication cookie 138 then the authentication-login dialog 140 is presented in the downloaded third party website 127 which prompts the end user 102 to enter cable provider information 142 (steps 3-4). The authentication engine 116 comprises: (a) a provider access directory 132; (b) a processor 128; and (c) a non-transitory memory 130 that stores processor-executable instructions wherein the processor 128 interfaces with the non-transitory memory 130 and executes the processor-executable instructions to: (i) receive the cable provider information 142 and use the provider access directory 132 to determine a cable provider 106 and a cable head-end 119 that services the set-top box 104 (step 5); (ii) send the end user verification message 144 to the cable head-end 119 (step 6), wherein the cable head-end 119 receives the end user verification message 144 and determines if the end user 102 is associated with the cable provider 106 and if yes sends an end user verification acknowledgment message 146 (step 7); (iii) receive the end user verification acknowledgement message 146 and interact with the cable head-end 119 to map the set-top box 104 to the end user 104 (step 8 and steps 1'-5'); (iv) request the cable head-end 119 to stream the video 110 from the video-on-demand application 120 to the set-top box 104 after the set-top box 104 is mapped to the end user 102 (step 9); (v) send the client device 112 updated authentication information 152 to be stored in the authentication cookie 138 for future use in case the end user 102 requests the third party video provider 108 or another third party video provider to stream the another video to the set-top box 104 (step 10); and (vi) store the cable provider information 142 and corresponding information related to the cable provider 106 and the cable head-end 119 for subsequent use to stream another video to the set-top box 104 without requiring the end user 102 to enter all of the cable provider information 142 into the authentication-login dialog 140, wherein the another video is associated with either the third party video provider 108 or another third party video provider (step 11).

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A system for authenticating an end user and associating their set-top box with a third party web based application to stream a third party video to the set-top box, the system comprising:
   a third party video provider with a third party web based application, wherein the third party video provider has a plurality of videos which can be streamed to the set-top box;
   a client device which has the third party web based application downloaded therein by the end user, wherein the end user uses the third party web based application which lists the plurality of videos that can be streamed to the set-top box to select a video to be streamed to the set-top box;

the third party video provider checks if the client device contains an authentication cookie and if there is no authentication cookie then an authentication-login dialog is presented in the downloaded third party web based application which prompts the end user to enter video provider information;

an authentication engine receives the video provider information and uses a provider access directory located therein to determine a video provider and a video head-end that services the set-top box;

the authentication engine sends an end user verification message to the video head-end;

the video head-end is associated with a billing system and a video-on-demand application, wherein the video-on-demand application contains the selected video which was downloaded therein by the third party video provider, and wherein the billing system receives the end user verification message and if the end user is associated with the video provider then sends an end user verification acknowledgment message to the authentication engine;

the authentication engine receives the end user verification acknowledgement message and then interacts with the billing system to map the set-top box to the end user;

the authentication engine after the set-top box is mapped to the end user requests the video head-end to stream the selected video from the video-on-demand application to the set-top box; and the authentication engine stores the video provider information and corresponding information related to the video provider and the video head-end for subsequent use to stream another video to the set-top box without requiring the end user to enter all of the video provider information into the authentication-login dialog, wherein the another video is associated with either the third party video provider or another third party video provider.

2. The system of claim 1, wherein the authentication engine upon receiving the end user verification acknowledgment signal sends the client device updated authentication information to be stored in the authentication cookie for future use in case the end user requests the third party video provider or another third party video provider to stream the another video to the set-top box.

3. The system of claim 1, wherein when thethird' party video provider determines the client device contains the authentication cookie then:

the authentication engine receives authentication information from the authentication cookie and checks the authentication information to determine if ok to instruct the video head-end to stream the video to the set-top box;

if ok, then the authentication engine instructs the video head-end to stream the selected video to the set-top box, and if not ok, then the authentication engine prompts the end user to input a user name and password but not all of the video provider information into the authentication-login dialog and then checks the user name and password and if ok then instructs the video head-end to stream the selected video to the set-top box.

4. The system of claim 3, wherein the authentication cookie includes an expiration time indicator.

5. The system of claim 3, wherein the authentication cookie includes an authentication token which the authentication engine uses to determine the user name and password of the end-user in which case the end user does not need to re-enter the user name and password into the authentication-login dialog.

6. The system of claim 1, wherein the video provider information comprises a video provider identifier, a user name, a password, an identifier indicating the video, and an end user geographical location identifier.

7. The system of claim 1, wherein the set-top box is mapped to the end user as follows:

the authentication engine sends a request to the billing system for set-top box information associated with the end-user:

the authentication engine receives the set-top box information and presents the set-top box information in the authentication-login dialog and requests the end user to select the set-top box; and the authentication engine sends information about the selected set-top box to the billing system.

8. The system of claim 7, wherein:

the billing system receives the information about the selected set-top box and then sends a token to be displayed at the selected set-top box or a television associated therewith and the end user enters the token into the authentication-login dialog box;

the authentication engine receives the token entered into the authentication-login dialog box and sends the token to the billing system which confirms or denies the mapping of the set-top box to the end user.

9. A method for authenticating an end user and associating their set-top box with a third party web based application to stream a third party video to the set-top box, the method comprising the steps of:

downloading a third party web based application into a client device, wherein the end user interacts with the third party web based application which lists a plurality of videos that can be streamed to the set-top box to select a video to be streamed to the set-top box;

checking, at a third party video provider, if the client device contains an authentication cookie and if there is no authentication cookie then presenting an authentication-login dialog in the downloaded third party web based application which prompts the end user to enter video provider information;

receiving, at an authentication engine, the video provider information and using a provider access directory located therein to determine a video provider and a video head-end that services the set-top box;

sending, from the authentication engine, an end user verification message to the video head-end;

receiving, at the video head-end, the end user verification message and if the end user is associated with the third party video provider then sending an end user verification acknowledgment message to the authentication engine, wherein the video head-end is associated with a billing system and a video-on-demand application, wherein the video-on-demand application contains the selected video which was downloaded therein by the third party video provider, and wherein the billing system receives the end user verification message and determines if the end user is associated with the video provider;

receiving, at the authentication engine, the end user verification acknowledgement message and then interacting with the billing system to map the set-top box to the end user;

requesting, at the authentication engine, the video head-end to stream the selected video from the video-on-demand application to the set-top box; and storing, at the authentication engine, the video provider information and corresponding information related to the video provider and the video head-end for subsequent use to stream another video to the set-top box without requiring the end user to enter all of the video provider information into the authentication-login dialog, wherein the another video is associated with either the third party video provider or another third party video provider.

10. The method of claim 9, wherein the authentication engine upon receiving the end user verification acknowledgment signal sends the client device updated authentication information to be stored in the authentication cookie for future use in case the end user requests the third party video provider or another third party video provider to stream the another video to the set-top box.

11. The method of claim 9, wherein when the third party video provider determines the client device contains the authentication cookie then:

the authentication engine receives authentication information from the authentication cookie and checks the authentication information to determine if ok to instruct the video head-end to stream the selected video to the set-top box;

if ok, then the authentication engine instructs the video head-end to stream the selected video to the set-top box, and if not ok, then the authentication engine prompts the end user to input a user name and password but not all of the video provider information into the authentication-login dialog and then checks the user name and password and if ok then instructs the video head-end to stream the selected video to the set-top box.

12. The method of claim 11, wherein the authentication cookie includes an expiration time indicator.

13. The method of claim 11, wherein the authentication cookie includes an authentication token which the authentication engine uses to determine the user name and password of the end-user in which case the end user does not need to re-enter the user name and password into the authentication-login dialog.

14. The method of claim 9, wherein the video provider information comprises a video provider identifier, a user name, a password, an identifier indicating the video, and an end user geographical location identifier.

15. The method of claim 9, wherein the set-top box is mapped to the end user as follows:

the authentication engine sending a request to the billing system for set-top box information associated with the end-user;

the authentication engine receiving the set-top box information and presenting the set-top box information in the authentication-login dialog and requesting the end user to select the set-top box; and the authentication engine sending information about the selected set-top box to the billing system.

16. The method of claim 15, wherein:

the billing system receiving the information about the selected set-top box and then sending a token to be displayed at the selected set-top box or a television associated therewith and the end user entering the token into the authentication-login dialog box;

the authentication engine receiving the token entered into the authentication-login dialog box and sending the token to the billing system which confirms or denies the mapping of the set-top box to the end user.

17. An authentication engine used in a system that includes a third party video provider with a third party web based application, a client device which has the third party web based application downloaded therein by the end user, wherein the end user uses the third party web based application to select a third party video to be streamed to the set-top box, and the third party video provider checks if the client device contains an authentication cookie and if there is no authentication cookie then an authentication-login dialog is presented in the downloaded third party web based application which prompts the end user to enter video provider information, the authentication engine comprising:

a provider access directory;

a processor; and a non-transitory memory that stores processor-executable instructions wherein the processor interfaces with the non-transitory memory and executes the processor-executable instructions to:

receive the video provider information and use the provider access directory o determine a video provider and a video head-end that services the set-top box;

send an end user verification message to the video head-end, wherein the video head-end receives the end user verification message and determines if the end user is associated with the video provider and if yes sends an end user verification acknowledgment message;

receive the end user verification acknowledgement message and interact with the video head-end to map the set-top box to the end user;

request the video head-end to stream the selected video from the video-on-demand application to the set-top box after the set-top box is mapped to the end user; and store the video provider information and corresponding information related to the video provider and the video head-end for subsequent use to stream another video to the set-top box without requiring the end user to enter all of the video provider information into the authentication-login dialog, wherein the another video is associated with either the third party video provider or another third party video provider.

18. The authentication engine of claim 17, wherein the processor further executes the processor-executable instructions to send the client device updated authentication information to be stored in the authentication cookie for future use in case the end user requests the third party video provider or another third party video provider to stream the another video to the set-top box.

19. The authentication engine of claim 17, wherein when the third party video provider determines the client device contains the authentication cookie then the processor further executes the processor-executable instructions to:

receive authentication information from the authentication cookie and check the authentication information to determine if ok to instruct the video head-end to stream the selected video to the set-top box;

if ok, then instruct the video head-end to stream the selected video to the set-top box, and if not ok, then prompt the end user to input a user name and password but not all of the video provider information into the authentication-login dialog and then check the user name and password and if ok then instruct the video head-end to stream the selected video to the set-top box.

20. The authentication engine of claim 19, wherein the authentication cookie includes an expiration time indicator.

21. The authentication engine of claim 19, wherein the authentication cookie includes an authentication token which the authentication engine uses to determine the user name and password of the end-user in which case the end user does not need to re-enter the user name and password into the authentication-login dialog.

22. The authentication engine of claim 19, wherein the video provider information comprises a video provider identifier, a user name, a password, an identifier indicating the video, and an end user geographical location identifier.

23. The authentication engine of claim 19, wherein the processor further executes the processor-executable instructions to map the set-top box to the end user by:
sending a request to the billing system for set-top box information associated with the end-user;
receiving the set-top box information and presents the set-top box information in the authentication-login dialog and requesting the end user to select the set-top box; and
sending information about the selected set-top box to the billing system.

24. The authentication engine of claim 23, wherein the billing system receives the information about the selected set-top box and then sends a token to be displayed at the selected set-top box or a television associated therewith and the end user enters the token into the authentication-login dialog box, then processor further executes the processor-executable instructions to:
receive the token entered into the authentication-login dialog box and send the token to the billing system which confirms or denies the mapping of the set-top box to the end user.

25. A method implemented by an authentication engine which includes at least a provider access directory wherein the authentication engine is used in a system that includes a third party video provider with a third party web based application, a client device which has the third party web based application downloaded therein by the end user, and wherein the end user uses the third party web based application to select a third party video to be streamed to the set-top box, and the third party video provider checks if the client device contains an authentication cookie and if there is no authentication cookie then an authentication-login dialog is presented in the downloaded third party web based application which prompts the end user to enter video provider information, the method comprising steps of:
receiving the video provider information and use the provider access directory to determine a video provider and a video head-end that services the set-top box;
sending an end user verification message to the video head-end, wherein the video head-end receives the end user verification message and determines if the end user is associated with the video provider and if yes sends an end user verification acknowledgment message;
receiving the end user verification acknowledgement message and interact with the video head-end to map the set-top box to the end user;
requesting the video head-end to stream the selected video from the video-on-demand application to the set-top box after the set-top box is mapped to the end user; and
storing the video provider information and corresponding information related to the video provider and the video head-end for subsequent use to stream another video to the set-top box without requiring the end user to enter all of the video provider information into the authentication-login dialog, wherein the another video is associated with either the third party video provider or another third party video provider.

26. The method of claim 25, further comprising a step of sending the client device updated authentication information to be stored in the authentication cookie for future use in case the end user requests the third party video provider or another third party video provider to stream the another video to the set-top box.

27. The method of claim 25, wherein when the third party video provider determines the client device contains the authentication cookie then the authentication engine further performs steps of:
receiving authentication information from the authentication cookie and checking the authentication information to determine if ok to instruct the video head-end to stream the selected video to the set-top box;
if ok, then instructing the video head-end to stream the selected video to the set-top box, and
if not ok, then prompting the end user to input a user name and password but not all of the video provider information into the authentication-login dialog and then check the user name and password and if ok then instruct the video head-end to stream the selected video to the set-top box.

28. The method of claim 27, wherein the authentication cookie includes an expiration time indicator.

29. The method of claim 27, wherein the authentication cookie includes an authentication token which the authentication engine uses to determine the user name and password of the end-user in which case the end user does not need to re-enter the user name and password into the authentication-login dialog.

30. The method of claim 27, wherein the video provider information comprises a video provider identifier, a user name, a password, an identifier indicating the video, and an end user geographical location identifier.

31. The method of claim 25 wherein the authentication engine maps the set-top box to the end user by:
sending a request to the billing system for set-top box information associated with the end-user;
receiving the set-top box information;
presenting the set-top box information in the authentication-login dialog;
requesting the end user to select the set-top box; and
sending information about the selected set-top box to the billing system.

32. The method of claim 25, wherein the billing system receives the information about the selected set-top box and then sends a token to be displayed at the selected set-top box or a television associated therewith and the end user enters the token into the authentication-login dialog box, then the authentication engine implements following steps:
receiving the token entered into the authentication-login dialog box; and
sending the token to the billing system which confirms or denies the mapping of the set-top box to the end user.

33. A client device used by an end user to select a video provided by a third party video provider which is then streamed by their video provider to their set-top box, the client device comprising:
a processor; and
a non-transitory memory that stores processor-executable instructions wherein the processor interfaces with the non-transitory memory and executes the processor-executable instructions to:
download a third party web based application provided by the third party video provider, wherein the third party web based application lists a plurality of videos that can be streamed to the set-top box;

enable the end user to use the third party web based application to select a video to be streamed to the set-top box;
if the client device does not contain an authentication cookie, then present an authentication-login dialog which prompts the end user to enter video provider information; and
receive set-top box information in the authentication-login dialog requesting the end user to select the set-top box which is to receive the selected video streamed from their video provider.

34. A third party video provider which an end user with a client device interacts with to select a video which is then is provided to a video provider associated with the end user and then the selected video is streamed by the video provider to a set-top box associated with the end user, the third party video provider comprising:
a processor; and
a non-transitory memory that stores processor-executable instructions wherein the processor interfaces with the non-transitory memory and executes the processor-executable instructions to:
forward a third party web based application to the client device, wherein the third party web based application lists a plurality of videos that can be streamed to the set-top box, and wherein the end user uses the third party web based application to select a video to be streamed to the set-top box;
check if the client device contains an authentication cookie and if there is no authentication cookie then present an authentication-login dialog in the downloaded third party web based application which prompts the end user to enter video provider information; and download the selected video to the video provider which then streams the selected video to the set-top box.

35. A video provider which streams a video to a set-top box associated with an end user, wherein the end user has a client device that previously interacted with a third party video provider to select the video which is to be streamed to the set-top box associated with the end user, and wherein the video provider interacts with an authentication engine, the video provider comprising:
a video head-end which comprises an video-on-demand application; and
a billing system;
the video-on-demand application is configured to receive the selected video from the third party video provider;
the billing system is configured to receive an end user verification message from the authentication engine;
the billing system is configured upon receipt of the end user verification message to determine if the end user is associated with the video provider;
if the end user is associated with the video provider, then the billing system is configured to (1) send an end user verification acknowledgment message to the authentication engine; and (2) interact with the authentication engine to map the set-top box to the end user;
after the set-top box is mapped to the end user, then the video head-end streams the selected video from the video-on-demand application to the set-top box.

36. The system of claim 1, wherein the video provider is coupled via a satellite wireless connection to the set-top box.

37. The method of claim 9, wherein the video provider is coupled via a satellite wireless connection to the set-top box.

* * * * *

UNITED STATES PATENT AND TRADEMARK OFFICE
CERTIFICATE OF CORRECTION

| | |
|---|---|
| PATENT NO. | : 8,904,423 B2 |
| APPLICATION NO. | : 13/027307 |
| DATED | : December 2, 2014 |
| INVENTOR(S) | : Reynolds et al. |

Page 1 of 1

It is certified that error appears in the above-identified patent and that said Letters Patent is hereby corrected as shown below:

Specification

In Column 5, Line 36, delete "Message" and insert -- message --, therefor.

In Column 5, Line 61, delete "updated IS" and insert -- updated --, therefor.

Claims

In Column 9, Line 48, in Claim 3, delete "thethird'" and insert -- the third --, therefor.

In Column 12, Line 22, in Claim 16, delete "o determine" and insert -- to determine --, therefor.

In Column 13, Line 11, in Claim 23, delete "claim 19," and insert -- claim 17, --, therefor.

In Column 13, Line 33, in Claim 25, delete "directory wherein" and insert -- directory, wherein --, therefor.

Signed and Sealed this
Twenty-seventh Day of October, 2015

Michelle K. Lee
*Director of the United States Patent and Trademark Office*